UNITED STATES PATENT OFFICE.

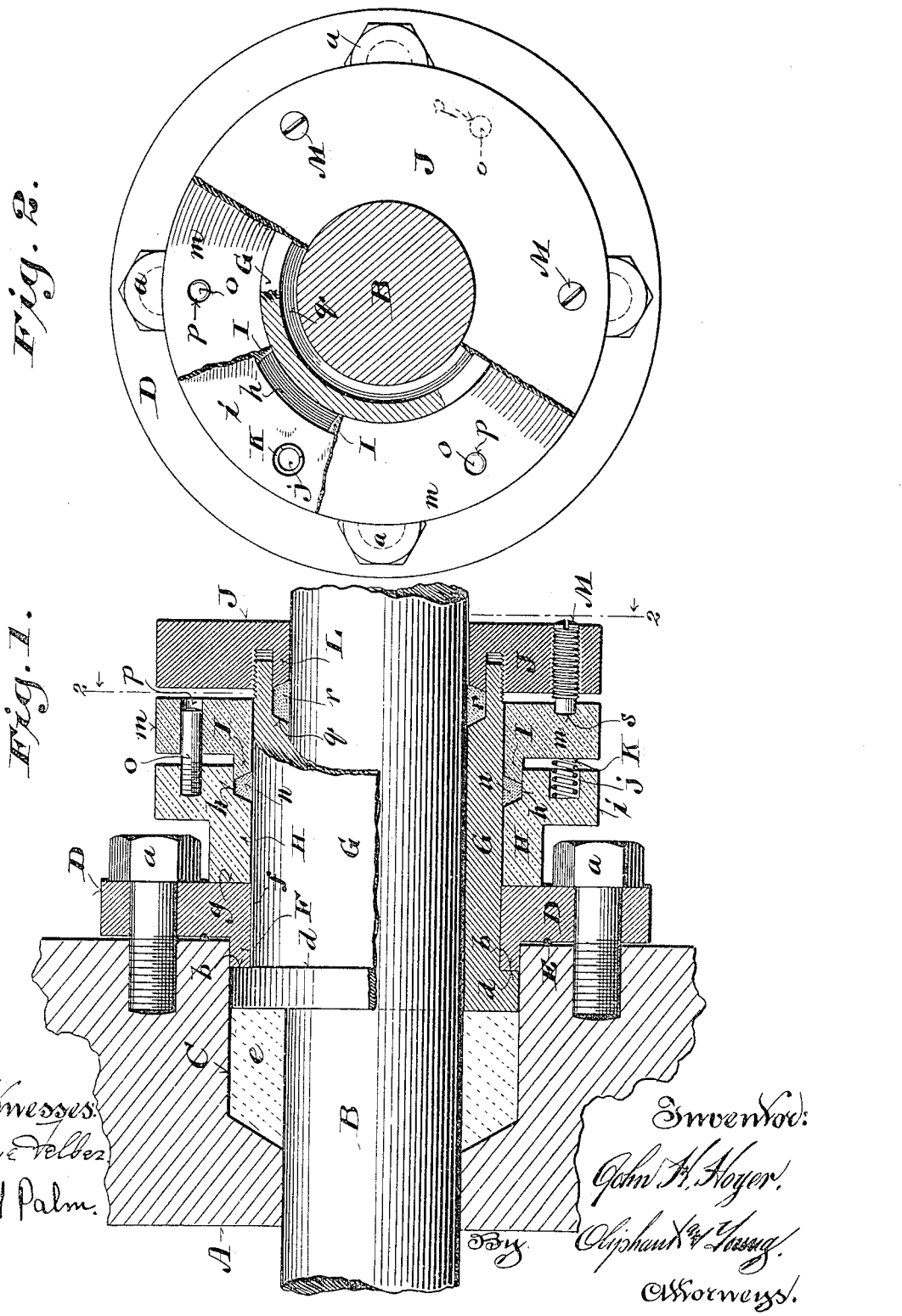

JOHN H. HOYER, OF CORLISS, WISCONSIN.

PACKING FOR SHAFTS AND ROTARY-VALVE STEMS.

No. 819,227.      Specification of Letters Patent.      Patented May 1, 1906.

Application filed October 23, 1905. Serial No. 283,935.

*To all whom it may concern:*

Be it known that I, JOHN H. HOYER, a citizen of the United States, and a resident of Corliss, in the county of Racine and State of Wisconsin, have invented certain new and useful Improvements in Packing for Shafts and Rotary-Valve Stems; and I do hereby declare that the following is a full, clear, and exact description thereof.

The object of my invention is to provide a simple, economical, and effective packing for shafts and rotary-valve stems, said packing being revoluble with the shaft or stem to which it is adjusted; and said invention consists in certain peculiarities of construction and combination of parts hereinafter fully set forth with reference to the accompanying drawings and subsequently claimed.

In the drawings, Figure 1 represents a sectional elevation of a packing made in accordance with my invention, said packing being shown in connection with a shaft and cylinder-head, a portion of the packing-sleeve being broken away to better illustrate the invention; and Fig. 2, a face view of the same with parts broken away and in section, as indicated by line 2 2 of Fig. 1.

Referring by letter to the drawings, A indicates a fragment of a cylinder-head of a turbine-engine or the casing for a rotary valve, and B a shaft or valve-stem for which it forms a bearing and is provided with the usual stuffing-box C and cap D, secured thereto by bolts $a$, as shown. A soft-metal packing-gasket E is interposed between the inner face of the cap D and an outer wall of the head A to form a steam-tight joint, said cap being provided with an annular flange F, fitted into the stuffing-box. The face $b$ of the flange F is ground to fit a corresponding face of a shoulder $d$, projecting from a sleeve G, that is mounted upon the shaft and revolves therewith. The shoulder $d$ of said sleeve is confined within the stuffing-box in opposition to a packing $e$ therein, this packing being of any desired material. The sleeve G, which is revolubly mounted in an opening $f$ of the stuffing-box, carries a thimble H, having a ground face at its inner end $g$, which abuts the outer face of the cap D, said thimble being provided at its outer end with an internal annular recess $h$ and a flange $i$, having pockets $j$ for the reception of spiral springs K, that oppose a gland I, also mounted upon said sleeve. The gland I is fitted into the recess $h$ of the aforesaid thimble and is provided with a right-angle collar $m$, the said recess $h$ being filled with any suitable packing material $n$, which is compressed therein by said gland to produce a steam-tight joint between the sleeve G and thimble at this point, the gland being held against rotation with relation to the thimble by studs $o$, projecting from the latter and engaging openings $p$ in the collar $m$ thereof.

The outer end of sleeve G is threaded exteriorly for the reception of a ferrule J, which is mounted upon the shaft B and has a gland L, adapted to fit into an internal recess $q$ in the end of the sleeve aforesaid, the recess forming a seat for a packing $r$, which is forced against the shaft by the gland L of ferrule J when the latter is turned on the threaded end of the sleeve. Ferrule J is tapped radially at intervals for the reception of screws M, having their ends reduced and socketed into openings $s$ in the collar $m$ of gland I, and these screws serve to lock said gland against independent rotation with relation to the sleeve and its component parts and also furnish a means of adjusting the several steam-tight joints in the following manner: The parts being assembled as shown, the ferrule J is run on the end of the sleeve G until the packing $r$ is sufficiently compressed to bind said sleeve and shaft B against rotation with relation to each other, and consequently make a steam-tight joint between the two longitudinally of the shaft. The screws M are then fitted into the openings $s$ of said ring, and if revolved further their action will tend to spread the aforesaid ferrule and gland I apart, thus drawing the ground face $c$ of the sleeve tightly against the face $b$ of the cap-flange F and simultaneously therewith causing the ground face $g$ of the thimble to be forced against the outer face of the cap D, thereby forming a double radial ground joint at the junction of the cap D and the packing members. Longitudinal leak at the peripheral surface of the sleeve is provided against by the packing $n$, which is expanded against said sleeve as the screws are adjusted to force the gland forward. The spiral springs K, interposed between the thimble and collar $m$ of said gland, are for the purpose of permitting slight longitudinal elasticity between the contacting faces of the revolving packing with relation to the faces of the stuffing-box cap.

By the above description it will be seen that the several parts constituting the packing are so arranged upon the shaft that they will revolve therewith and reduce the friction to a minimum, said packing forming a positive and simple steam-tight joint in all directions between the shaft and stationary parts constituting the stuffing-box and bearing of said shaft, provision being made for adjusting all the members of the packing simultaneously or independent of each other, as the case may require, a further advantage being in the fact that the packing is so arranged that the latter may readily be assembled or dismantled for repairs, &c.

Having thus described my invention, what I claim as new, and desire to secure by Letters Patent, is—

1. A rotary-shaft packing, comprising a stationary cap, a sleeve mounted therein, through which the shaft is adapted to project, a shoulder on the sleeve in opposition to one face of the cap, a thimble mounted upon said sleeve and arranged to abut the other face of said cap, means for packing the thimble and sleeve-joint, means for packing the sleeve and shaft joint, and other means for adjusting said shoulder and thimble against the faces of the cap.

2. A rotary-shaft packing comprising a stationary cap, a sleeve mounted therein, through which the shaft is adapted to project, a shoulder on the sleeve in opposition to one face of the cap, a thimble mounted upon said sleeve and arranged to abut the other face of said cap, a recess in the end of the thimble, a gland fitted in said recess, a longitudinally-adjustable ferrule secured to the end of the aforesaid sleeve, and means in connection with the ferrule and thimble, whereby the latter is adjusted to one face of the cap simultaneously with the sleeve-shoulder to the opposite face thereof.

3. A rotary-shaft packing comprising a stationary cap, a sleeve mounted therein through which the shaft is adapted to project, a shoulder on the sleeve in opposition to one face of the cap, a thimble mounted upon said sleeve and arranged to abut the opposite face of said cap, a recess in the end of the thimble, a gland fitted in said recess, means for holding the gland against rotation with relation to the thimble, springs interposed between the latter and said gland, a ferrule in threaded connection with the sleeve whereby the latter is made steam-tight with relation to said shaft, and adjusting-screws in connection with the ferrule and the aforesaid gland.

In testimony that I claim the foregoing I have hereunto set my hand, at Milwaukee, in the county of Milwaukee and State of Wisconsin, in the presence of two witnesses.

JOHN H. HOYER.

Witnesses:
N. E. OLIPHANT,
GEORGE FELBER.